(12) United States Patent
Huo (10) Patent No.: US 8,442,310 B2
(45) Date of Patent: May 14, 2013

(54) AFFINE DISTORTION COMPENSATION

(75) Inventor: Qiang Huo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 12/771,774

(22) Filed: Apr. 30, 2010

(65) Prior Publication Data

US 2011/0268351 A1 Nov. 3, 2011

(51) Int. Cl.
*G06K 9/62* (2006.01)
*G06K 9/00* (2006.01)

(52) U.S. Cl.
USPC .......................................... 382/161; 382/187

(58) Field of Classification Search .......... 382/159–161, 382/186–189, 224
See application file for complete search history.

(56) References Cited

U.S. PATENT DOCUMENTS

| 2008/0219556 | A1 | 9/2008 | Han et al. |
| 2009/0003705 | A1 | 1/2009 | Zou et al. |
| 2009/0041354 | A1 | 2/2009 | Liu |

FOREIGN PATENT DOCUMENTS

| WO | 2008012824 A1 | 1/2008 |

OTHER PUBLICATIONS

Zeng; et al., "Markov Random Field-Based Statistical Character Structure Modeling for Handwritten Chinese Character Recognition"—Published Date: May 2008 http://ieeexplore.ieee.org/stamp/stamp.jsp?tp=&arnumber=4359349.
Rosenthal; et al., "Size and Orientation Normalization of On-Line Handwriting using Hough Transform"—Published Date: Apr. 21-24, 1997, http://ieeexplore.ieee.org/stamp/stamp.jsp?tp=& arnumber=595442.
Liu; et al., "Global Shape Normalization for Handwritten Chinese Character Recognition": A—Published Date: Oct. 26-29, 2004, http://ieeexplore.ieee.org/stamp/stamp.jsp?tp=& arnumber=1363927.
Bharath A, Sriganesh Madhvanath "Hidden Markov Models for Online Handwritten Tamil Word Recognition"—Published Date: Jul. 6, 2007, http://www.hpl.hp.com/techreports/2007/HPL-2007-108.pdf.
Bai; et al., "A Study on the Use of 8-Directional Features for Online Handwritten Chinese Character Recognition", 2005, http://ieeexplore.ieee.org/stamp/stamp.jsp?arnumber=01575550.
M.J.F. Gales, "Maximum Likelihood Linear Transformations for HMM-Based Speech Recognition", May 1997, http://citeseerx.ist.psu.edu/viewdoc/download?doi=10.1.1.37.8252&rep=rep1& type=pdf.
Nakagawa; et al., "Collection of on-Line Handwritten Japanese Character Pattern Databases and Their Analysis", 2004, pp. 69-81, http://www.tuat.jp/~nakagawa/pub/2004/pdf/nakagawa0404a-e.pdf.
He; et al., "A Character-Structure-Guided Approach to Estimating Possible Orientations of a Rotated Isolated Online Handwritten Chinese Character" 2009 10th International Conference on Document Analysis and Recognition, http://ieeexplore.ieee.org/stamp/stamp.jsp?tp=&arnumber=5277600.
He; et al., "Affine Distortion Compensation for an Isolated Online Handwritten Chinese Character Using Combined Orientation Estimation and HMM-Based Minimax Classification", 2009 http://ieeexplore.ieee.org/stamp/stamp.jsp?tp=&arnumber=5277645.

(Continued)

*Primary Examiner* — Daniel Mariam
(74) *Attorney, Agent, or Firm* — Microsoft Corporation (57) ABSTRACT

One or more techniques and/or systems are disclosed for compensating for affine distortions in handwriting recognition. Orientation estimation is performed on a handwriting sample to generate a set of likely characters for the sample. An estimated affine transform is determined for the sample by applying hidden Markov model (HMM) based minimax testing to the sample using the set of likely characters. The estimated affine transform is applied to the sample to compensate for the affine distortions of the sample, yielding an affine distortion compensated sample.

20 Claims, 8 Drawing Sheets

OTHER PUBLICATIONS

Huo, Qiang, "A Decision Theoretic Formulation for Robust Automatic Speech Recognition", Mar. 7, 2006, http://berlin.csie.ntnu.edu.tw/Courses/2006S-Special%20Topics%20in%20Spoken%20Language%20Processing/Lectures/SLP2006S_Lecture02-A%20decision%20Theoretic%20Formulation%20for%20Robust%20Automatic%20Speech%20Recognition-Part-I.pdf.

Huo; et al., "A minimax classification approach to HMM-based online handwritten Chinese character recognition robust against affine distortions," Proc. ICDAR-2007, vol. 1, pp. 43-47. http://ieeexplore.ieee.org/stamp/stamp.jsp?tp=&arnumber=4479572.

Leggetter; et al., "Maximum Likelihood Linear Regression for Speaker Adaptation of Continuous Density Hidden Markov Models", 1995, pp. 171-185, http://citeseerx.ist.psu.edu/viewdoc/download?doi=10.1.1.89.2050&rep=rep1&type=pdf.

AFFINE DISTORTION COMPENSATION

BACKGROUND

Computer-based handwriting recognition systems, can be used for characters that are written directly onto a touch sensitive input (e.g., screen), and/or for characters scanned from a written document. When characters are written onto a screen, for example, to be recognized (e.g., and digitized) it is often referred to as online recognition. When a user inputs handwritten characters onto a screen, for example, by writing with a stylus onto a touch-sensitive screen of a handheld device, the device may be oriented in any way, and the input may also be oriented in a variety of ways. Recognition systems usually comprise a character classifier that compares the written unknown sample against a trained model. Users of the handwriting recognizers prefer that it yields accurate results; however, as input orientations may vary from device to device and user to user, accuracy of the recognition of the input characters may be hampered by affine distortion provided by various orientations.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Current technology does not provide for an effective handwritten character classifier that is robust against affine distortion for isolated characters. That is, for example, a single character, such as an East Asian (e.g., Chinese, Japanese, Korean) written character, can be written in a variety of orientations on a plane formed by the surface of an input device. Recognizing the orientation of an isolated character cannot benefit from comparison to adjacent characters, such as when written in a word or sentence. Therefore, if not compensated for, the possible affine distortion (e.g., rotation around the characters axis on the surface plane) can affect classification accuracy of the character.

Current techniques often compare individual characters with those adjacent or in a string to determine a potential affine distortion. However, this technique cannot be applied to isolated characters. Further, some systems determine a potential affine distortion of a character and then apply the estimated distortion to training samples that are used to train the handwriting classification model. These systems are typically computationally costly due to a large set of potential character classes, particularly for EA characters, used in the determination. Further, they are limited to the classification model used in the training.

Accordingly, one or more techniques and/or systems are disclosed that provide for estimating an affine transformation for respective unknown and possibly distorted handwriting samples. The estimated transform can be used to compensate the distortion of the original sample. The compensated sample can then be recognized more accurately by different (e.g. any) handwriting classifier, and is not limited to those trained by changing the training samples. Further, the transformation is determined over a set of likely character classes for the sample, thereby mitigating computer resource costs.

In one embodiment for compensating for affine distortions in handwriting recognition, orientation estimation is performed on a handwriting sample to generate a set of likely character classes for the sample. Further, an estimated affine transform is determined for the sample by applying hidden Markov model (HMM) based minimax testing (e.g., and solving for the parameters) to the sample using the set of likely characters. Additionally, the estimated affine transform is applied to the sample to compensate for the affine distortions of the sample. Thereby resulting in a compensated sample, for example, that can be applied to any handwriting recognizer.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
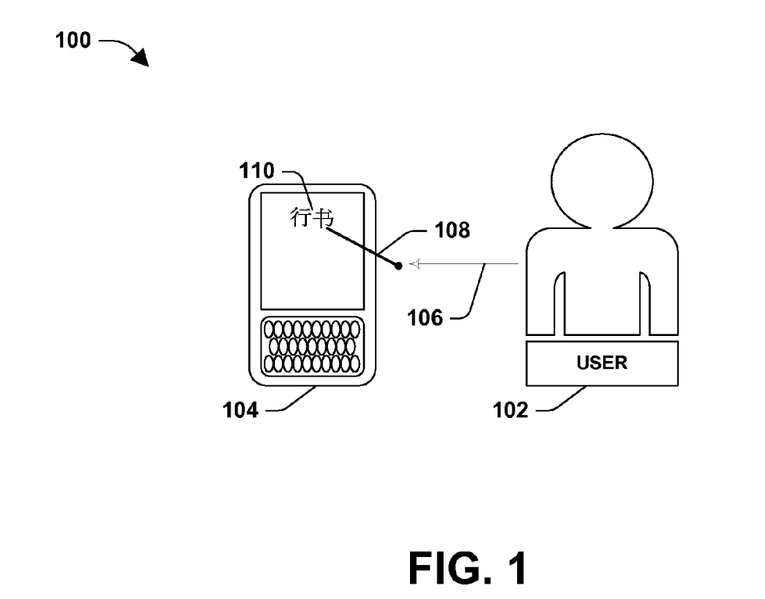
FIG. 1 illustrates an example environment in which one or more techniques, described herein, may be implemented.

FIG. 1 illustrates an example environment 100 in which one or more techniques, described herein, may be implemented. Applications employed by a mobile device 104, such as a smart phone, tablet computer, etc., may allow a user 102 to interact 106 by handwriting characters 110 directly onto an interaction area (e.g., screen), such as by using a stylus 108.

For example, the user 102 may wish to take notes on the mobile device 110 in lieu of typing using a small keyboard, or the device may not employ a hard keyboard. Often, the handwritten notes can be recognized and converted to computer-based typewritten text, for example, to be organized in a word processing document. Typically, these types of recognizers perform online recognition that occurs automatically as the text is written.

As an example, a handwritten character 110 may be entered 106 using an input device, such as a touch-screen digitizer 104 and stylus 108. A recognizer application resident on the device 104 receives the "ink" data (e.g., comprising the strokes and timing, known as trajectory data), from which features are extracted from the unknown characters 110. Typically, a trained handwriting recognizer matches the unknown characters' features to features of known characters (e.g., stored as classification data from training). The recognizer may calculate similarity scores for each known character, and a decision rule can select the character class having a highest score, for example, and output it as a recognized character. Similarly, the recognizer may output more than one character depending on the application and settings, such as by creating a list of most likely characters.

However, "ink" samples, for example, that a user (e.g., 102) enters onto a touch-screen digitizer (e.g., 104) may be entered in various orientations, depending on how the devices is held and/or how the user writes. A method may be devised that provides for construction of a handwriting recognizer that is robust against potential global affine distortion. That is, the characters entered by the user may not line up in a linear fashion across the screen, for example, and may exhibit some form of affine distortion. Characters that exhibit affine distortion may provide some difficulty in the recognition phase of the recognizer, as they may not "line-up" with a writing block provided to input characters for recognition.

Figure 2:
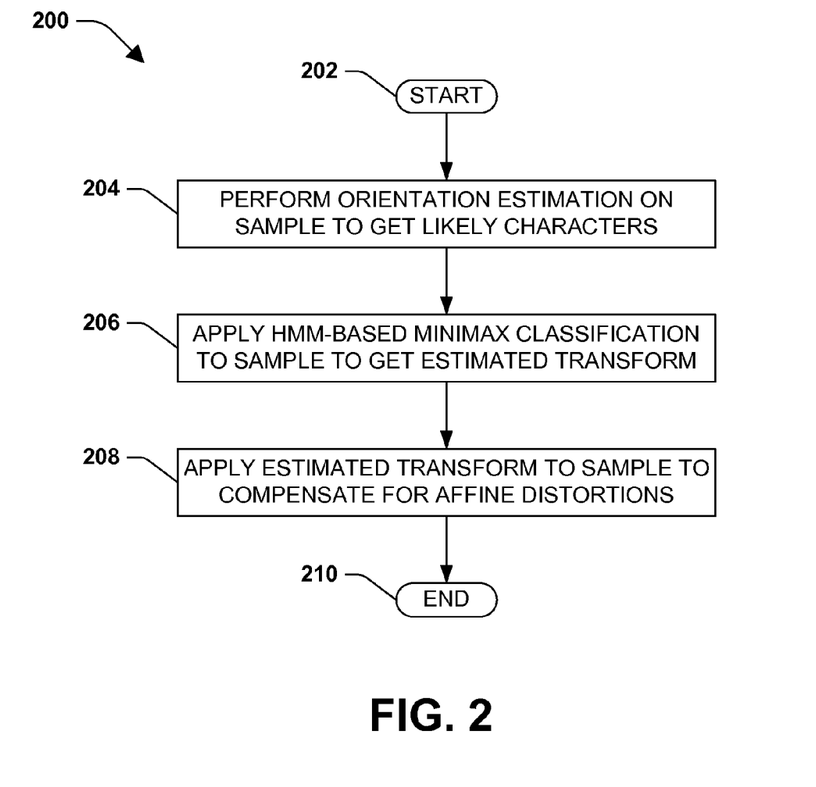
FIG. 2 is a flow diagram of an exemplary method for compensating for affine distortions in handwriting recognition.

FIG. 2 is a flow diagram of an exemplary method 200 for compensating for affine distortions in handwriting recognition. The exemplary method 200 begins at 202 and involves performing orientation estimation on a handwriting sample, such as an "ink" sample on a mobile device screen, to yield a set of likely characters for the sample, at 204. For example, when informative clues are presented that may indicate orientation of characters, such as a string of characters in a word or phrase, reasonable orientation estimations can typically be made. However, it is often more difficult to determine appropriate orientation of isolated characters.

In this embodiment, possible orientations of the sample can be estimated, such as for isolated characters, using a character orientation estimator. Further, in this embodiment, after a number of possible orientations are estimated, for example, potential characters can be determined for each of the possible orientations. In this way, in this example, a number of potential characters are generated for the sample character. In one embodiment, those potential characters can comprise a set of characters that are mostly likely to be the sample character, for example, where respective possible orientations provide a number of potential characters. In this way, a number of potential characters are reduced from all the possibilities, to merely those that are more likely.

At 206, in the exemplary method 200, an estimated affine transform for the sample is determined by applying hidden Markov model (HMM) based minimax testing to the sample using the set of likely characters for the model. For example, a minimax classification problem is solved for an unknown character sample, where a HMM is constructed for respective character classes to which the unknown character sample may belong. In this example, the respective HMMs are used in the minimax classification problem, and the respective character classes are limited to those provided by the set of characters that are mostly likely to be the sample character, as described above. In this embodiment, a by-product of solving the minimax classification problem is the estimated affine transform for the sample.

At 208, the unknown character sample can be compensated for affine distortion by applying the estimated affine transform to the sample. For example, the handwritten character may have been distorted when it was "inked" onto the touch-sensitive digitizer (e.g., rotated on a plane comprised by the screen). In this example, the estimated affine distortion may be determined to be clockwise by fifteen degrees; therefore, the sample can be compensated by rotating it counterclockwise by fifteen degrees. In this way, for example, the compensated sample may be plugged into any handwriting recognizer for character recognition, and it will be robust against affine distortion.

Figure 3:
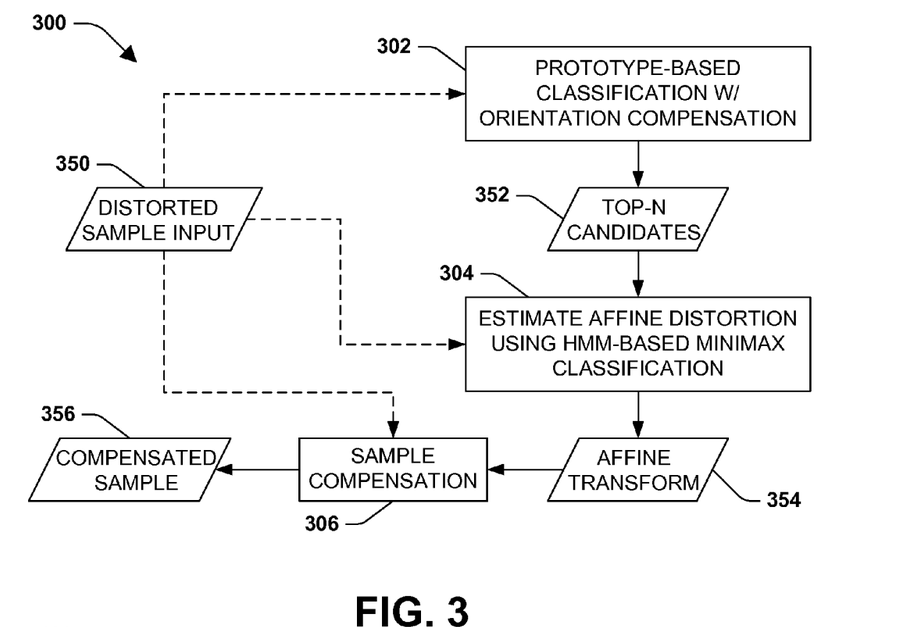
FIG. 3 is a flow diagram illustrating one embodiment of an implementation of one or more of the techniques described herein.

FIG. 3 is a flow diagram illustrating one embodiment 300 of an implementation of one or more of the techniques described above. A distorted sample 350 is input, such as by user writing an ink sample onto a screen of their smart phone (e.g., as a memo). Typically, affine distortion for handwriting recognition is limited to rotation clockwise or counter-clockwise around a central axis on a plane formed by the writing surface, for example. As an illustrative example 400, in FIG. 4, a handwritten character, such as an English character 402 or a Chinese character 404, may exhibit no affine distortion 402, 404 when written in what is considered a "normal" orientation. That is, for example, the orientation of the characters can be considered typical for a character class when its orientation approximates that of a typewritten version of the character.

Figure 4:
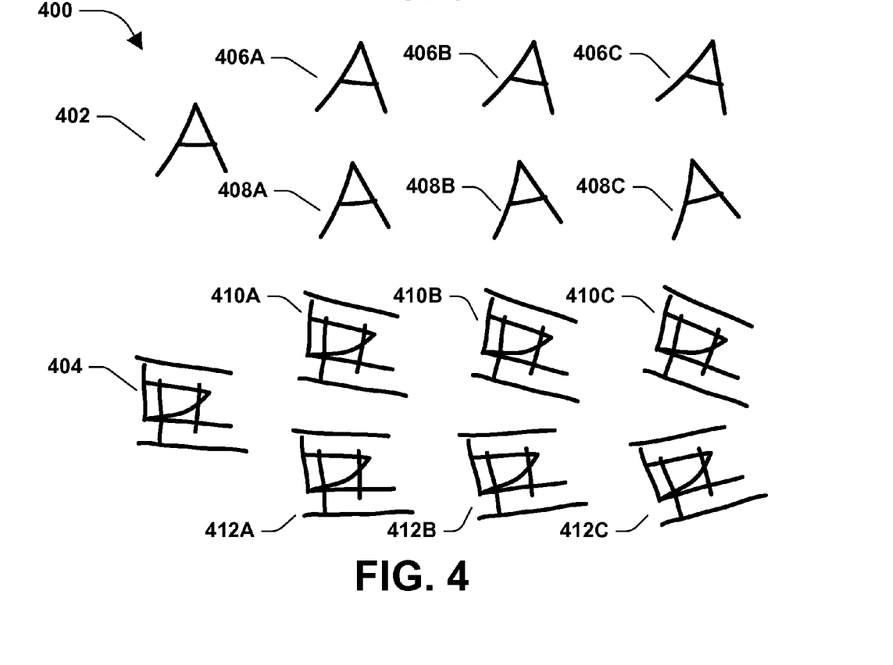
FIG. 4 is an illustration of example handwritten characters for which one or more techniques described herein may be applied.

In the exemplary embodiment 400, the distortion can comprise clockwise rotation, as illustrated by the characters 406A-C and 410A-C; or counterclockwise rotation, as illustrated by characters 408A-C and 412A-C. In these examples, the characters have been approximately rotated by ten degrees 406-412A, twenty degrees 408-412B and thirty degrees 408-412C. As described above, the distortion may be a result of how the device comprising the screen is oriented during the writing of the "ink" sample, and/or may result from how a user writes, for example.

Returning to the exemplary embodiment 300, of FIG. 3, at 302, the distorted sample (e.g., one of 406-412 A-C, of FIG. 4) can be run through a prototype-based classification with orientation compensation. That is, in one embodiment, orientation compensated potential characters can be determined by a combination of orientation estimation and a character classifier to generate a set of likely characters for the sample.

For example, as described above, a number of estimated orientations can be determined for the distorted sample, and a number of compensated potential characters can be generated by applying the estimated orientations to the sample. In this example, the respective compensated potential characters are run through a prototype-based handwriting character classifier, and a set of likely characters are determined for the sample. In one embodiment, the classifier can be a single-prototype classifier, where each character class has a representative single prototype used in the classification.

Further, a subset of the set of likely characters can be selected, such as those that are within a desired percentile range from the classification. That is, for example, the classifier can determine a likelihood percentage that the compensated potential character is a member of a character class, such as a ninety percent chance that the sample is the letter "A." In this embodiment, those likely characters that are within the top fifteen percentile can be selected as a subset, such as a top-N characters (where N is the desired selection criteria, such a desired number of characters, percentile, or some other selection criteria). In this way, in this example, merely those most likely can be used in the subset of the top-N characters, for example.

At 304 in the exemplary embodiment 300, an affine distortion is determined, by performing an HMM-based minimax classification for the top-N character candidates 352. For example, an HMM can be developed for the respective potential characters (top-N candidates 352), and the minimax classification can be solved using the HMMs. In this way, in this example, an affine transform 354 is determined for the distorted sample as part of the minimax problem solving.

At 306, the distorted sample is compensated using the affine transform 354. That is, for example, the orientation of the distorted sample is transformed using the affine transform to yield a compensated sample 356. As illustrated in FIG. 4, the sample may be distorted (e.g., 406-412 A-C) by being rotated either clockwise or counterclockwise on the surface plane. In this example, the affine transform 354 is used to rotate the distorted sample to yield a compensated sample 356, such as 402 or 404. In one embodiment, the compensated sample 356 can then be plugged into any character classifier to identify the sample, for example.

Figure 5:
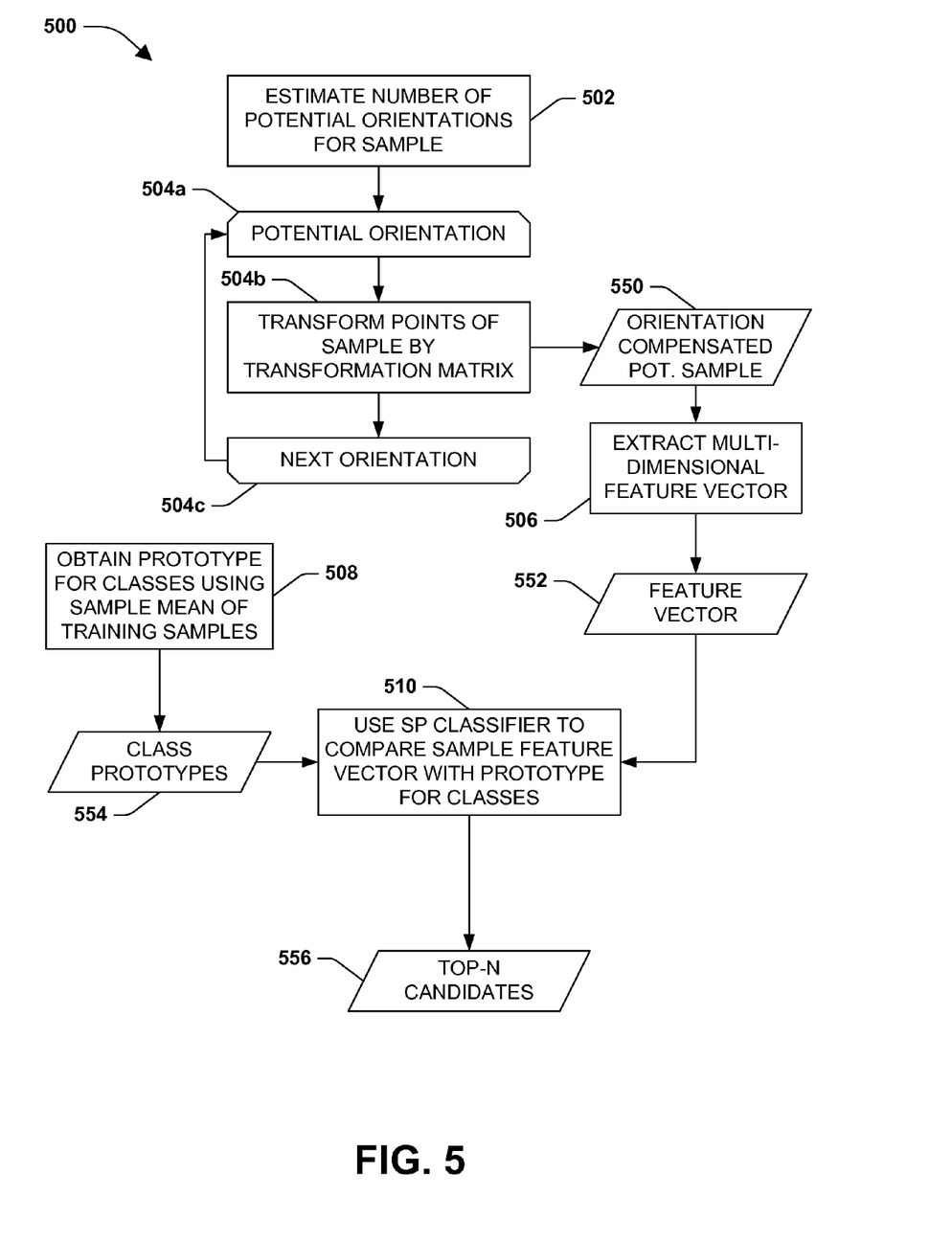
FIG. 5 is a flow diagram that illustrates an exemplary embodiment where a set of likely candidates can be generated from a possibly distorted sample.

FIG. 5 is a flow diagram that illustrates an exemplary embodiment 500 where a set of likely candidates are generated from a possibly distorted sample. At 502, a desired number of potential character orientations are estimated for the sample (e.g., a possibly distorted handwritten sample). The embodiments described herein are not limited to any particular orientation estimation method or system. For example, in one embodiment, the orientation can be performed by monitoring primary axes of the sample, represented as modes of directional histograms. In this embodiment, directional features are extracted from the sample, and directional histograms constructed for orientation estimation.

At 504a-c, for respective potential character orientations 504a, respective points of the sample are transformed by a desired transformation matrix to produce an orientation compensated potential character, at 504b. In one embodiment, a possibly distorted handwritten character sample can be represented as a time-ordered sequence of points, such as $P=(P_0, P_1, \ldots, P_t; \ldots P_T)$ where $P_t=(x_t; y_t)$ are coordinates of the t-th point. For example, when a character is written the strokes are drawn in time ordered sequence starting from a beginning point and ending at an ending point.

In this embodiment, a sample can be represented as a sequence of points. Further, the points can be transformed (e.g., moved on the plane) in accordance with the transformation matrix. In one embodiment, a desired transformation can comprise the following:

$$W_{\phi_i} = \begin{bmatrix} \cos(-\phi_i) & -\sin(-\phi_i) \\ \sin(-\phi_i) & \cos(-\phi_i) \end{bmatrix}$$

where $\phi_i$ is a possible character orientation (e.g., hypothesis of an orientation), and $W_{\phi i}$ is the transformation for the hypothesis, for example. In this way, for example, respective points of the sample are moved on the plane such that the entire character is rotated on the plane, to produce an orientation compensated potential character 550.

At 506 in the exemplary embodiment 500, a multi-dimensional feature vector 552 is extracted from the respective orientation compensated potential characters 550. In one embodiment, a 512-dimensional raw feature vector, for example, comprising 8-directional features can be extracted from respective orientation compensated potential characters $\hat{P}_i$ for example, using an available feature vector extraction technique often used for handwriting recognition. The feature vectors 552 can be used to represent the orientation compensated potential characters for the sample.

At 510, the feature vectors can be run through a single-prototype classifier. In one embodiment, a new 80-dimensional feature vector can be obtained using Linear Discriminant Analysis (LDA) transformation estimated from training samples, for the classifier. At 508, a prototype can be obtained for respective character classes (e.g., representing each character in a written language) for the classifier, using a sample mean of a multidimensional feature vector (e.g., the new 80-dimensional feature vector) for the character classes. In this way, respective character classes for the written language (e.g., EA written languages) have a representative prototype 554 for the classifier, for example.

In this embodiment, the single-prototype classifier is used to compare the multi-dimensional feature vector 552 for the respective orientation compensated potential characters to the prototype 554 for the respective classes to generate a set of likely characters for the sample. For example, a potential character is run through the classifier and a set of possible character classes is generated, respectively comprising a percentage likelihood of membership to that class. In this way, in this example, those potential characters that have a highest likelihood can be selected as a set of likely characters for the sample 556 (top-N candidates).

In one embodiment, the desired number of potential character orientations (L) (e.g., 504 a and c) for a possibly distorted sample can be three or less orientations (L≦3). Further, the set of likely characters (N) (e.g., 556) for the possibly distorted sample can be three or more characters (N≧3). In this embodiment, the orientation compensated potential characters are a subset of the likely characters, and a subset provided by one orientation compensated potential character is different than a subset provided by a second orientation compensated potential character. Additionally, the number of characters in a subset can be the number of likely characters in the set divided by the desired number of potential character orientations for the orientation compensated potential character (N/L).

Figure 6:
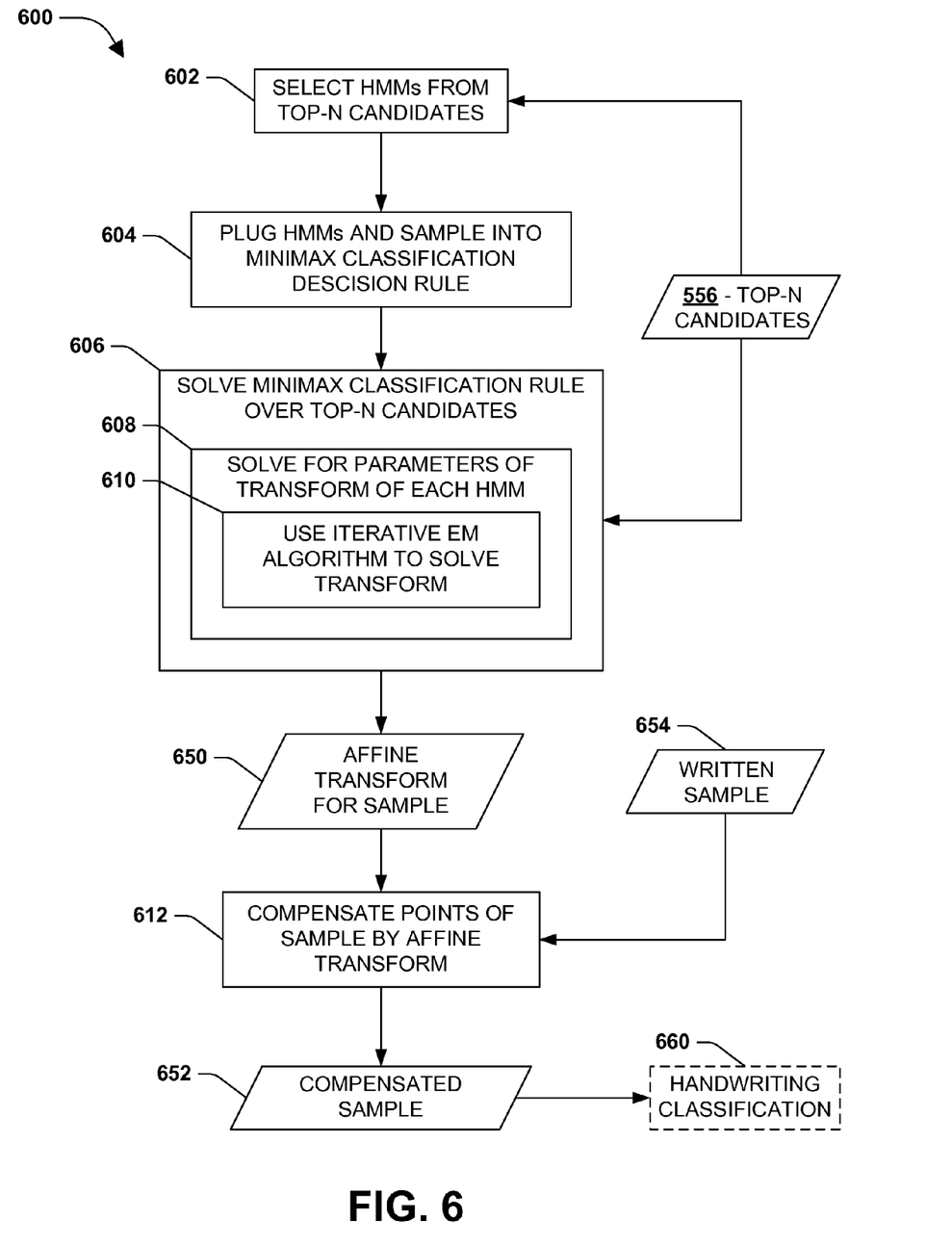
FIG. 6 is a flow diagram illustrating an exemplary embodiment where HMM-based minimax classification may be used to compensate a possibly distorted sample for affine distortion.

FIG. 6 is a flow diagram illustrating an exemplary embodiment 600 where HMM-based minimax classification is used to compensate a possibly distorted sample for affine distortion. At 602, in order to determine an estimated affine transform for the sample, a set of hidden Markov Models (HMMs), such as a continuous-density HMMs (CDHMMs), can be selected for the respective character classes from the set of likely characters (e.g., top-N candidates 556).

In one embodiment, given a handwriting sample $P=(P_0, P_1, \ldots, P_t; \ldots, P_T)$, where $P_t=(x_t; y_t)$ are coordinates of the t-th point, it can be represented as a sequence of observation feature vectors $O=(O_1, \ldots, O_t; \ldots, O_T)$, where $O_t=(x_t-x_{t-1}; y_t-y_{t-1})$ is a simple 2-dimensional feature vector computed at point $P_t$. Then, a Gaussian-mixture CDHMM can be used to model a character, for example, for M character classes, $C_i$, $i=1, 2, \ldots, M$. In this example, to accommodate variability of writing orders of strokes, a set of non-distorted training data for each character class $C_i$ can be clustered into several subsets. For an n-th subset having sufficient amounts of training data, a left-to-right CDHMM, $\lambda_i^{(n)}$, can be constructed using maximum likelihood (ML) training. Further, in this example, a number of states, $NS_i^{(n)}$, in each CDHMM $\lambda_i^{(n)}$ is determined as a number of line segments of a representative sample in a corresponding subset of training data. Consequently, respective character classes, $C_i$, may have $N_i$ CDHMMs, $\{\lambda_i^{(n)}, n=1; \ldots, N_i)\}$.

At 604 in the exemplary embodiment 600, the HMM (e.g., $\lambda_i^{(n)}$) can be plugged into a minimax classification decision rule. In one embodiment, solving a minimax classification rule for a character class for a sample can provide an affine transform for the sample. For example, the affine transform can be used as a distortion model in the minimax classification rule used to solve for the character class. At 606, the minimax classification rule is solved over the top-N candidates. As an example, the following minimax classification rule may classify an unknown character sample O as belonging to character class $C_i$ if:

$$i = \operatorname*{argmax}_{j} \left\{ \max_{n} \left[ \max_{S} \log p(O, S \mid T_{\hat{W}}(\lambda_j^{(n)})) \right] \right\}.$$

where S is the hidden state sequence of the corresponding HMM.

In this example, $T_W(\lambda_j^{(n)})$ denotes a specific transformation ($T_W$) of $\lambda_i^{(n)}$, with parameters W. At 608, the parameters for the minimax classification rule can be solved for, for example, such that:

$$\hat{W} = \operatorname*{argmax}_{W} p(O \mid T_W(\lambda_j^{(n)}))$$

In this example, solving for W can provide for solving the transform $T_W$, which can provide the estimated transform for the sample. Here, a maximum likelihood estimate of the parameters for the transform for the HMM of the character class is determined using the unknown handwriting sample as an observation (O).

At 610, to determine the maximum likelihood estimate of the transform parameters an expectation-maximization (EM) algorithm is run a desired number of times for the sample given the HMM. For example, the EM algorithm is typically used to find maximum likelihood (ML) estimates for parameters of the HMM. The EM algorithm is iterative, providing an expectation step for determining a likelihood given the estimates, and providing a maximization step to maximize parameters given the likelihood. In one embodiment, the EM algorithm can be run a number of times that provides a desired accuracy. That is, for example, running the EM iteration steps costs computational resources, but provides more accuracy. Therefore, in this example, a tradeoff between accuracy and resource use can be assessed to determine the desired number of iterations.

Having solved for the parameters of the HMM-based minimax classification, an affine transform 650 is also determined for the sample. For example, in the above equation for solving the parameters of the minimax classification, the transform $T_W$ is also solved, thereby providing the estimated transform for the unknown sample (O). Further, for "argmax" over j, merely the top-N candidates 556 are used, for example, in order to reduce a number of determinations.

At 612, the unknown written sample 654 can be compensated for affine distortion by applying the estimated affine transform 650 to coordinates of the respective points that make up the sample 654. As described above, a written sample (e.g., ink) can be comprised of time dependent points, determined by how it is "inked." In this embodiment, the affine transform can be applied to the respective points, for example, thereby moving the respective points on the plane to provide a transform equivalent to the distortion.

After the unknown sample 654 is compensated, the compensated sample 652 can be run through a handwriting classifier 660. In this way, the classification of the compensated sample 652 will not be affected by affine distortion, for example, thereby providing a more accurate classification result.

Figure 7:
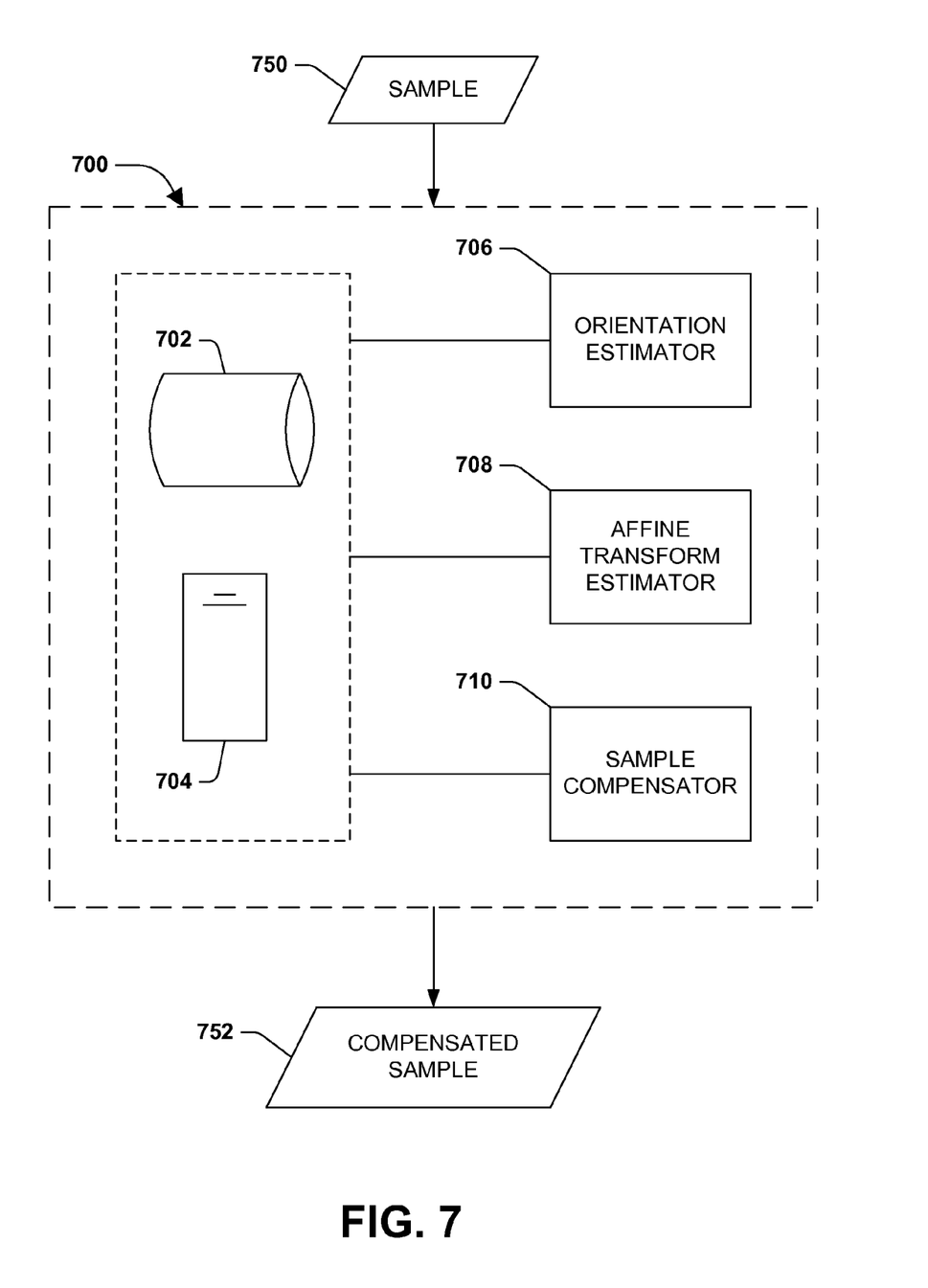
FIG. 7 is a component diagram of an exemplary system for compensating for affine distortions in computer-based handwriting recognition.

A system can be devised for estimating affine distortion of handwritten characters, such as for running through a handwriting classifier. FIG. 7 is a component diagram of an exemplary system 700 for compensating for affine distortions in computer-based handwriting recognition. A memory component 702 stores data that is used in determining an affine transform for a handwriting sample 750 (sample), such as an east Asian written language character, and a processor 704 is used to process input data to yield desired output data for respective system components. In one embodiment, these components may reside in separate unit (e.g., a computer) and can be operably coupled with other components in the system 700.

An orientation estimation component 706 is operably coupled to the memory component 702 and the processor 704. The orientation estimation component 706 determines a set of likely characters for the sample 750 by performing orientation estimation on the sample. An affine transform estimation component 708 is also operably coupled to the memory component 702 and processor 704. The affine transform estimation component 708 determines an estimated affine transform for the sample 750 by applying a hidden Markov model (HMM) based minimax testing rule to the sample 750 using the set of likely characters provided by the orientation estimation component 706.

A sample compensation component 710 is also operably coupled to the memory component 702 and processor 704. The sample compensation component 710 applies the estimated affine transform, from the affine transform estimation component 708, to the sample to produce an affine distortion compensated sample 752. In one embodiment, the compensated sample 752 can be run through a handwriting classifier to determine its character class without regard for possible affine distortion, for example.

Figure 8:
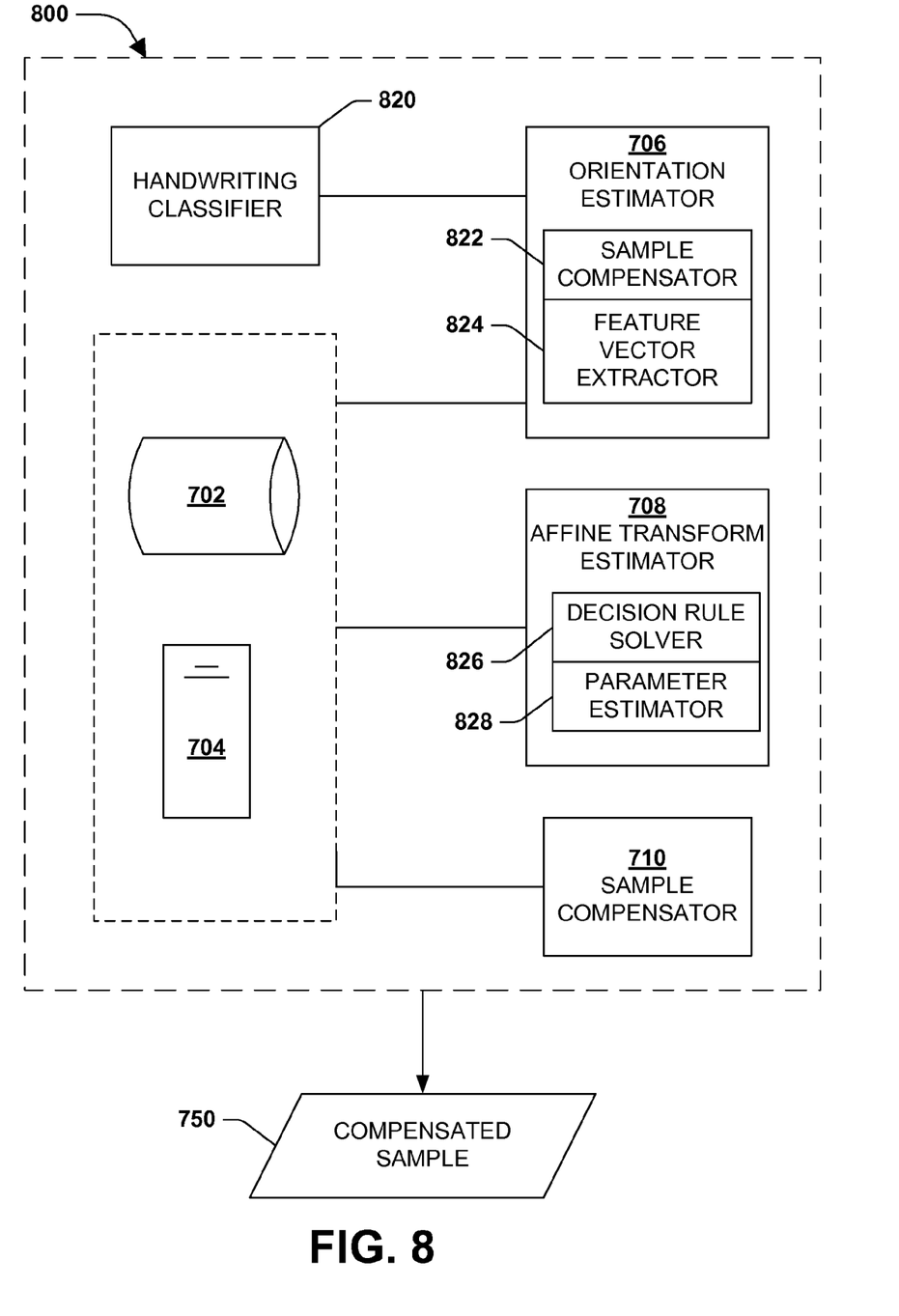
FIG. 8 is a component diagram illustrating one embodiment that implements one or more systems described herein.

FIG. 8 is a component diagram illustrating one embodiment 800 that implements one or more of the systems described herein. The orientation estimation component 706 can comprise a sample compensation component 822 that transforms points of the sample (e.g., 750 of FIG. 7) by a transformation matrix to get an orientation compensated potential sample for a potential character orientation of the sample. For example, the orientation estimation component 706 may provide a plurality of potential orientations and the sample compensation component 822 can provide a plurality of potential samples that have been compensated by the transformation matrix that comprises the hypothesized orientation.

The orientation estimation component 706 can further comprise a feature vector extraction component 824 that extracts a multi-dimensional feature vector from the orientation compensated potential samples, from the sample compensation component 822, for use in determining likely characters for the sample (e.g., 750). A handwriting character classifier 820 can be operably coupled to the orientation estimation component 706, and can classify orientation compensated potential samples provided by the orientation estimation component 706. For example, the multi-dimensional feature vectors for the orientation compensated potential samples, from the feature vector extraction component 824, can be used by the classifier 820 to compare with prototypes for the respective character classes. In this example, the classification can provide a set of likely characters for the sample.

The affine transform estimation component 708 can comprise a decision rule solving component 826 that solves a minimax classification problem to determine a character class for the sample. In this embodiment, the decision rule solving component 826 uses a transform for the HMM of the character class as a distortion model for minimax decision rule. In this way, for example, solving the minimax classification decision rule can also provide the estimated affine transform for the sample.

The affine transform estimation component 708 further comprises a parameter estimation component 828 that determines a maximum likelihood estimate of transform parameters for the HMM of the character class. The parameter estimation component 828 runs an expectation-maximization (EM) algorithm a desired number of times for the sample given the HMM. In this way, for example, in determining estimates for the parameters of the minimax classification rule, an estimate for the affine transform is also determined.

In this embodiment, the sample compensation component 710 can apply the estimated affine transform, provided by the affine transform estimation component 708, to the sample by transforming coordinates of respective points of the sample by the estimated affine transform. In this way, transforming the points of the sample by the estimated affine transform provides a compensated sample 750, for example, which can then be run through a desired handwriting classifier to determine its character class.

Figure 9:
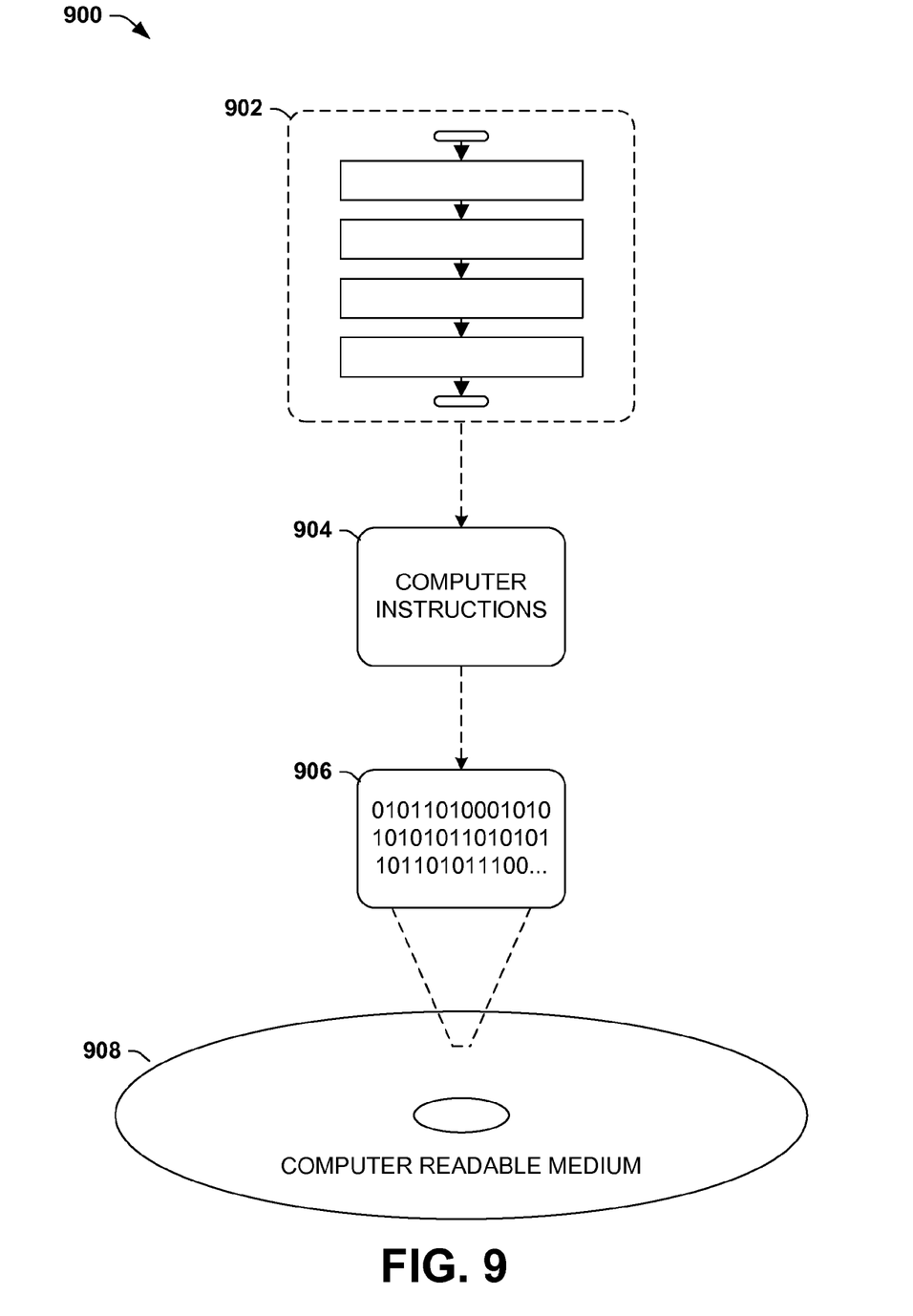
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as the exemplary method 200 of FIG. 2, for example. In another such embodiment, the processor-executable instructions 904 may be configured to implement a system, such as the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
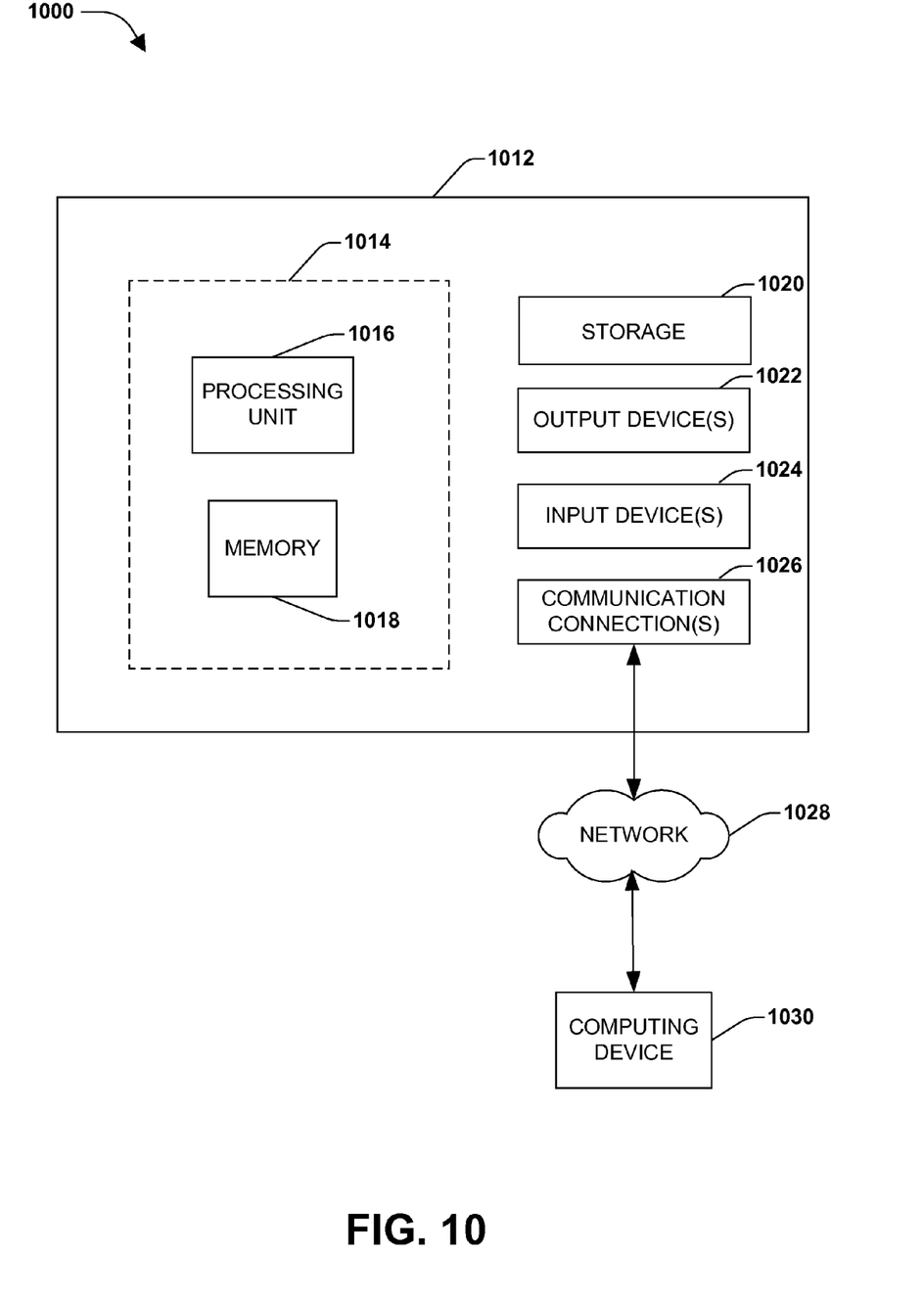
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for compensating for affine distortions in handwriting recognition, comprising:
   performing orientation estimation on a handwriting sample to yield a set of likely characters;
   determining an estimated affine transform for the handwriting sample by applying a hidden Markov model (HMM) based minimax test to at least some of the set of likely characters; and
   compensating for one or more affine distortions of the handwriting sample by applying the estimated affine transform to at least some of the handwriting sample.

2. The method of claim 1, comprising running one or more orientation compensated potential characters through a character classifier to generate a second set of likely characters for the handwriting sample, the one or more orientation compensated potential characters determined by orientation estimation.

3. The method of claim 1, performing orientation estimation comprising:

estimating a desired number of potential character orientations for the handwriting sample; and for one or more potential character orientations for the handwriting sample, transforming one or more points of the handwriting sample by a desired transformation matrix to yield an orientation compensated potential character.

4. The method of claim 3:

the desired number of potential character orientations (L) comprising three or less orientations;

the set of likely characters (N) comprising three or more characters; and the orientation compensated potential character comprising a subset of one or more likely characters that are different than one or more other likely characters provided by one or more other orientation compensated potential characters, a number of characters in the subset comprising a number of likely characters in the set divided by the desired number of potential character orientations (N/L).

5. The method of claim 1, comprising:

extracting a multi-dimensional feature vector from a second handwriting sample; and obtaining a prototype for a character class based upon the multi-dimensional feature vector.

6. The method of claim 5, comprising using a single-prototype classifier to compare the multi-dimensional feature vector to the prototype to generate a second set of likely characters for the handwriting sample.

7. The method of claim 1, determining an estimated affine transform comprising determining a first HMM for a first character class associated with the set of likely characters.

8. The method of claim 1, applying an HMM based minimax test comprising solving a minimax classification problem to determine a character class for the handwriting sample.

9. The method of claim 8, comprising solving the minimax classification problem over the set of likely characters.

10. The method of claim 8, solving a minimax classification problem comprising determining a maximum likelihood estimate of one or more transform parameters.

11. The method of claim 10, determining a maximum likelihood estimate of one or more transform parameters comprising running an expectation-maximization (EM) algorithm a desired number of times for the handwriting sample.

12. The method of claim 1, compensating for one or more affine distortions of the handwriting sample by applying the estimated affine transform to at least some of the handwriting sample comprising transforming one or more coordinates of one or more points of the handwriting sample by the estimated affine transform.

13. A system for compensating for affine distortions in computer-based handwriting recognition, comprising:

an orientation estimation component configured to determine a set of likely characters for a handwriting sample by performing orientation estimation on the handwriting sample;

an affine transform estimation component configured to determine an estimated affine transform for the handwriting sample by applying a hidden Markov model (HMM) based minimax test to at least some of the set of likely characters; and a handwriting sample compensation component configured to apply the estimated affine transform to at least some of the handwriting sample to yield an affine distortion compensated handwriting sample.

14. The system of claim 13, comprising a handwriting character classifier configured to classify one or more orientation compensated potential characters.

15. The system of claim 13, the orientation estimation component comprising:

a handwriting sample compensation component configured to transform one or more points of the handwriting sample by a transformation matrix to get an orientation compensated potential handwriting sample for a potential character orientation of the handwriting sample; and a feature vector extraction component configured to extract a multi-dimensional feature vector from a second handwriting sample for use in determining one or more likely characters for the handwriting sample by a trained handwriting character classifier.

16. The system of claim 13, the affine transform estimation component comprising a decision rule solving component configured to solve a minimax classification problem to determine a character class for the handwriting sample.

17. The system of claim 16, the affine transform estimation component comprising a parameter estimation component configured to determine a maximum likelihood estimate of one or more transform parameters.

18. The system of claim 13, the handwriting sample compensation component configured to apply the estimated affine transform to the handwriting sample by transforming one or more coordinates of one or more points of the handwriting sample by the estimated affine transform.

19. The system of claim 13, the handwriting sample comprising an East Asian language symbol character.

20. A computer readable storage device comprising instructions that when executed perform a method for compensating for affine distortions in handwriting recognition of east Asian language symbol characters, the method comprising:

performing orientation estimation on a handwriting sample to yield a set of likely characters;

determining an estimated affine transform for the handwriting sample by applying a hidden Markov model (HMM) based minimax test to at least some of the set of likely characters; and compensating for one or more affine distortions of the handwriting sample by applying the estimated affine transform to at least some of the handwriting sample.

* * * * *